United States Patent
Matsushima

(10) Patent No.: US 11,127,113 B2
(45) Date of Patent: Sep. 21, 2021

(54) DISPLAY CONTROL APPARATUS AND CONTROL METHOD THEREOF

(71) Applicant: CANON KABUSHIKI KAISHA, Tokyo (JP)

(72) Inventor: Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 15/960,323

(22) Filed: Apr. 23, 2018

(65) Prior Publication Data

US 2018/0350037 A1 Dec. 6, 2018

(30) Foreign Application Priority Data

Jun. 5, 2017 (JP) .............................. JP2017-110982

(51) Int. Cl.
*G06T 3/40* (2006.01)
*H04N 5/232* (2006.01)
*H04N 5/225* (2006.01)

(52) U.S. Cl.
CPC ............... *G06T 3/40* (2013.01); *H04N 5/225* (2013.01); *H04N 5/23216* (2013.01); *H04N 5/23296* (2013.01); *H04N 5/232933* (2018.08); *H04N 5/23245* (2013.01)

(58) Field of Classification Search
CPC ..... G06T 3/40; H04N 5/232933; H04N 5/225
See application file for complete search history.

(56) References Cited

U.S. PATENT DOCUMENTS

| 2013/0222666 A1* | 8/2013 | Rydenhag | .......... H04N 5/23216 348/333.02 |
| 2013/0250157 A1* | 9/2013 | Yoshida | ............. H04N 5/23212 348/333.01 |

FOREIGN PATENT DOCUMENTS

| CN | 1738363 A | 2/2006 |
| CN | 1770255 A | 5/2006 |
| CN | 102081495 A | 6/2011 |
| CN | 102111555 A | 6/2011 |
| CN | 103327236 A | 9/2013 |
| EP | 2919111 A1 | 9/2015 |
| JP | 2007178735 A | 7/2007 |
| JP | 2013201527 A | 10/2013 |

* cited by examiner

*Primary Examiner* — Matthew Salvucci
(74) *Attorney, Agent, or Firm* — Canon U.S.A., Inc. I.P. Division

(57) ABSTRACT

A display control apparatus to display a display object on a display unit includes a display control unit to perform control. In a case where a predetermined operation is started while the display object is displayed on the display unit at a first magnification, the display control unit performs control to provide a display indicating an enlargement area of the display object based on the information about the enlargement position stored in the storage unit without changing a display magnification of the display object and then provide an enlarged display of the enlargement area of the display object based on the information about the enlargement position stored in the storage unit, even without the predetermined operation being newly started. The enlarged display is enlarged at more than the first magnification.

15 Claims, 7 Drawing Sheets

DISPLAY CONTROL APPARATUS AND CONTROL METHOD THEREOF

BACKGROUND OF THE INVENTION

Field of the Invention

The present disclosure relates to a display control apparatus and a control method thereof.

Description of the Related Art

Some imaging apparatuses are capable of a live view display for displaying an output (live view image) of an image sensor on a display unit. As discussed in Japanese Patent Application Laid-open No. 2013-201527, there has been known a function of providing an enlarged display of a live view image for the sake of a focus check or a more accurate focus adjustment during imaging. Japanese Patent Application Laid-Open No. 2007-178735 discusses a configuration for superimposing and displaying an angle of view frame corresponding to a specified zoom step of an optical zoom and angle of view frames corresponding to the previous and next zoom steps on a live view image on a liquid crystal monitor.

When an enlarged display of a live view image, or display object, is provided in response to an operation to give instructions for an enlarged display, which position the enlarged display is provided of may be difficult to understand.

As discussed in Japanese Patent Application Laid-Open No. 2013-201527, in response to an operation to give instructions for an enlarged display, a live view image of actual size may be displayed once and an index indicating an enlargement area may be superimposed thereon. An enlarged display of the live view image may then be provided in response to a new operation to give instructions for an enlarged display. Such a method, however, increases the number of operations needed to provide an enlarged display. The index indicating the enlargement area may be constantly superimposed and displayed on a live view image. Such a method, however, can interfere with the visibility of the live view image.

Japanese Patent Application Laid-Open No. 2007-178735 discusses superimposing and displaying the angle of view frames corresponding to the previous and next zoom steps on the live view image, whereby the zooming range can be easily figured out. However, since the technique is provided for optical zooming, the enlargement area lies in the center. In other words, no consideration is given to an enlarged display of areas other than the center of a display object such as a live view image.

SUMMARY OF THE INVENTION

The present disclosure is directed to making the enlargement area easily recognizable and reducing the number of operations needed to provide an enlarged display.

According to an aspect of the present invention, a display control apparatus to display a display object on a display unit includes a memory and at least one processor configured to function as: a storage unit configured to store information about an enlargement position of the display object, and a display control unit configured to perform control, wherein, in a case where a predetermined operation is started while the display object is displayed on the display unit at a first magnification, the display control unit performs control to provide a display indicating an enlargement area of the display object based on the information about the enlargement position stored in the storage unit without changing a display magnification of the display object and then provide an enlarged display of the enlargement area of the display object based on the information about the enlargement position stored in the storage unit, even without the predetermined operation being newly started, wherein the enlarged display is enlarged at more than the first magnification.

Further features of the present disclosure will become apparent from the following description of embodiments with reference to the attached drawings.

DESCRIPTION OF THE EMBODIMENTS

An embodiment of the present disclosure will be described in detail below with reference to the accompanying drawings. It is to be noted that the following embodiment is merely one example for implementing the present disclosure and can be appropriately modified or changed depending on individual constructions and various conditions of apparatuses to which the present disclosure is applied. Thus, the present disclosure is in no way limited to the following embodiment.

The embodiment of the present disclosure will be described below with reference to the accompanying drawings. The present embodiment describes an example in which a digital camera functions as a display control apparatus.

Figure 1:
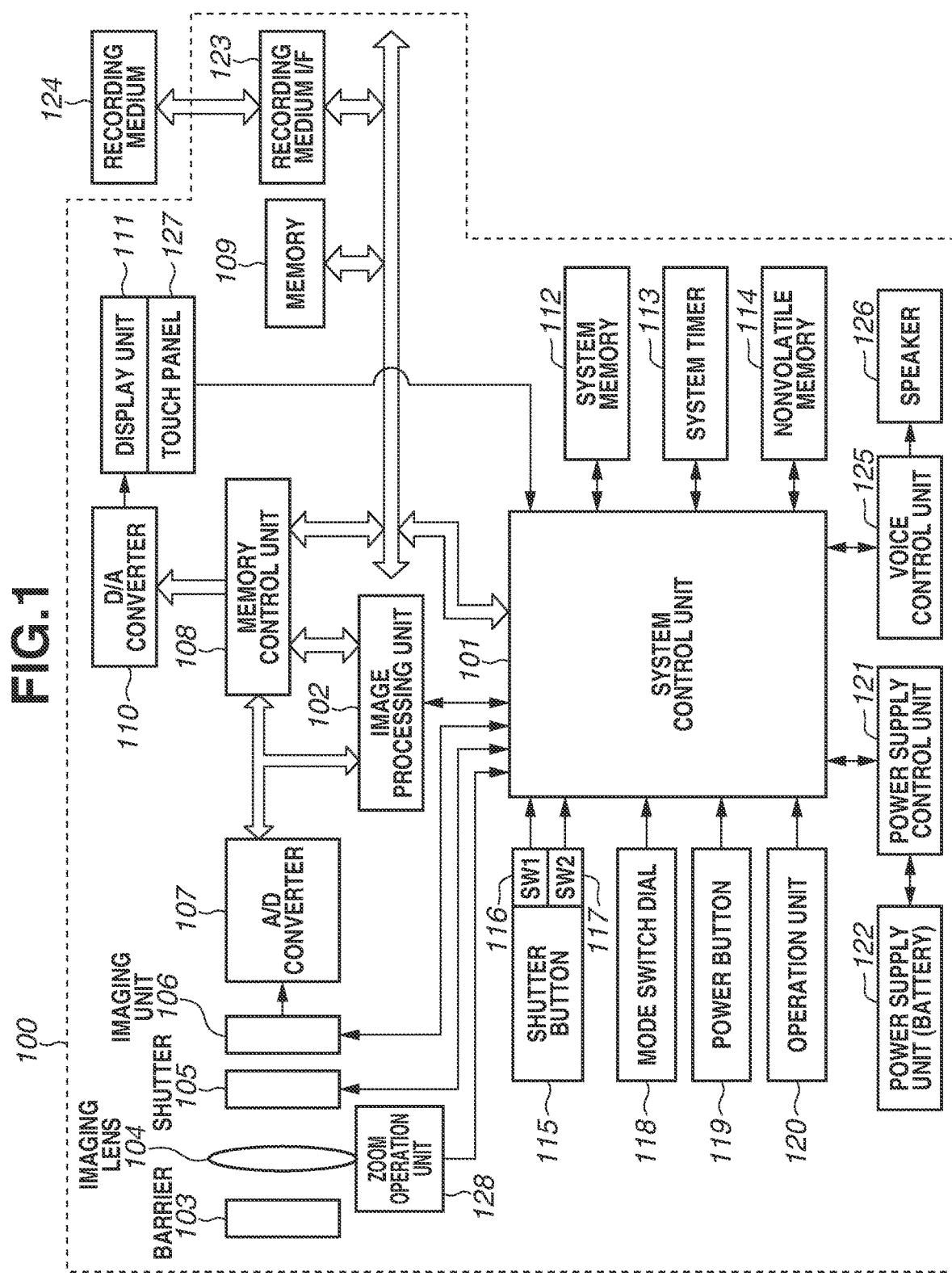
FIG. 1 is a block diagram illustrating a configuration example of a digital camera.
Figure 2:
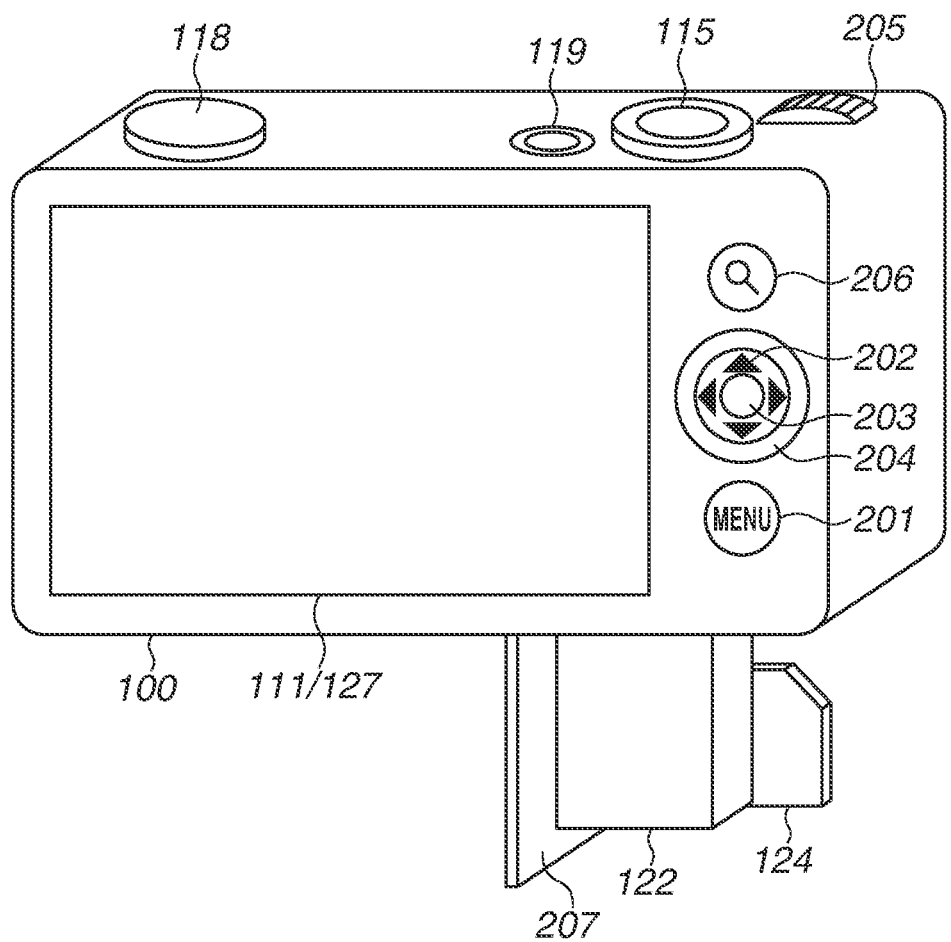
FIG. 2 is an external view of the digital camera.

FIG. 1 is a block diagram illustrating a configuration example of a digital camera 100. FIG. 2 is an external view of the digital camera 100.

An imaging lens 104 is a lens group including a zoom lens and a focus lens. A shutter 105 has an aperture function. An imaging unit 106 includes an image sensor for converting an optical image into an electrical signal. Examples of the image sensor include a charge-coupled device (CCD) image sensor and a complementary metal-oxide-semiconductor (CMOS) image sensor. An analog-to-digital (A/D) converter 107 converts an analog signal output from the imaging unit 106 into a digital signal. A barrier 103 covers an imaging system including the imaging lens 104, and thereby prevents stains and damage to the imaging system.

An image processing unit 102 performs predetermined resizing processing, such as pixel interpolation and reduction, and color conversion processing on data from the A/D converter 107 or data from a memory control unit 108. The image processing unit 102 performs predetermined calculation processing by using captured image data. Based on the obtained calculation result, a system control unit 101 performs exposure control and range finding control. Through-the-lens (TTL) autofocus (AF) processing, automatic exposure (AE) processing, and flash pre-emission (electronic flash (EF)) processing are thereby performed. The image processing unit 102 further performs predetermined calculation processing by using the captured image data, and performs TTL automatic white balancing (AWB) processing based on the obtained calculation result.

The data from the A/D converter 107 is written to a memory 109 via the image processing unit 102 and the memory control unit 108 or via the memory control unit 108. The memory 109 stores image data that is obtained by the imaging unit 106 and digitally converted by the A/D converter 107, and image data to be displayed on a display unit 111. The memory 109 has a storage capacity sufficient to store data on a predetermined number of still images and data on a predetermined duration of moving images and sounds. The memory 109 also serves as an image display memory (video memory).

A digital-to-analog (D/A) converter 110 converts image display data stored in the memory 109 into an analog signal, and supplies the analog signal to the display unit 111. The image display data stored in the memory 109 is thereby displayed on the display unit 111 via the D/A converter 110. The display unit 111 provides a display according to the analog signal from the D/A converter 110 on a display device such as a liquid crystal display (LCD). The digital signal that is once A/D converted by the A/D converter 107 and stored in the memory 109 can be analog-converted by the D/A converter 110, and sequentially transferred to and displayed on the display unit 111. The display unit 111 thereby functions as an electronic viewfinder and implements a live view for displaying a live view image. Hereinafter, a live view will be referred to as an LV.

The system control unit 101 includes at least one processor or circuit, and controls the entire digital camera 100. For example, the system control unit 101 performs display control by controlling the memory 109, the D/A converter 110, and the display unit 111.

A nonvolatile memory 114 is an electrically erasable and recordable memory. For example, an electrically erasable programmable read-only memory (EEPROM) is used as the nonvolatile memory 114. The nonvolatile memory 114 stores operation constants and programs of the system control unit 101. The programs here include ones for performing various flowcharts to be described below. The system control unit 101 executes the programs stored in the nonvolatile memory 114, whereby the processing of the present embodiment is implemented.

An example of a system memory 112 is a random access memory (RAM). The operation constants of the system control unit 101, variables, and programs read from the nonvolatile memory 114 are loaded into the system memory 112.

A system timer 113 is a clocking unit which measures time to be used for various controls and time of a built-in clock.

A shutter button 115, a mode switch dial 118, a power button 119, and an operation unit 120 are operation units for inputting various operation instructions to the system control unit 101. The mode switch dial 118 switches an operation mode of the digital camera 100 between a still image recording mode, a moving image recording mode, a playback mode, and detailed modes included in the respective operation modes. If the shutter button 115 is operated halfway, i.e., half-pressed (imaging preparation instruction), a first shutter switch 116 turns on to generate a first shutter switch signal SW1. According to the first shutter switch signal SW1, the system control unit 101 starts the operations of the AF processing, AE processing, AWB processing, and EF processing. If the shutter button 115 is completely operated, i.e., fully pressed (imaging instruction), a second shutter switch 117 turns on to generate a second shutter switch signal SW2. According to the second shutter switch SW2, the system control unit 101 starts the operation of a series of imaging processes from reading of a signal from the imaging unit 106 to writing of image data to a recording medium 124. The power button 119 instructs the digital camera 100 to power on and off. Details of the operation unit 120 will be described below.

A power supply control unit 121 includes a battery detection circuit, a direct-current-to-direct-current (DC-DC) converter, and a switch circuit for switching blocks to be energized. The power supply control unit 121 detects the state of the power button 119, the presence or absence of a battery attached, the type of battery, and the remaining battery level. The power supply control unit 121 controls the DC-DC converter based on the detection results and instructions from the system control unit 101, and supplies needed voltages to various parts, including the recording medium 124, for needed periods. A power supply unit (battery) 122 includes a primary battery such as an alkali battery and a lithium battery, a secondary battery such as a nickel-cadmium (NiCd) battery, a nickel-metal halide (NiMH) battery, and a lithium-ion (Li) battery, or an alternating-current (AC) adapter. As illustrated in FIG. 2, the battery 122 can be inserted into the digital camera 100 from the bottom, and can be covered with an openable-closable cover 207.

A recording medium, interface (I/F) 123 is an interface with the recording medium 124 like a memory card and a hard disk. The recording medium 124 is a memory card or other recording medium for recording captured images, and includes a semiconductor memory or a magnetic disk. As illustrated in FIG. 2, the recording medium 124 can be inserted into the digital camera 100 from the bottom, and can be covered with the openable-closable cover 207.

A voice control unit 125 generates voices. A speaker 126 pronounces the voices generated by the voice control unit 125. The digital camera 100 can thus make a notification, such as a warning, by voice.

A zoom operation unit 128 drives the zoom lens included in the imaging lens 104 under the control of the system control unit 101.

Details of the operation unit 120 will be described.

Operation members of the operation unit 120 are assigned appropriate functions scene by scene by selecting and operating various function icons displayed on the display unit 111. The operation members of the operation unit 120 thus function as various function buttons. Examples of the function buttons include an end button, a back button, an image forward button, a jump button, a narrow-down button, and an attribute change button. For example, if a menu button 201 illustrated in FIG. 2 is pressed, various types of settable menu screens are displayed on the display unit 111. The user can intuitively make various settings by using the menu screens displayed on the display unit 111, a directional pad (direction instruction keys) 202 including buttons in up, down, left, and right, four directions, and a set button 203. A controller wheel 204 and an electronic dial 205 are operation members capable of rotating operations, included in the operation unit 120. The controller wheel 204 and the electronic dial 205 are used with the directional pad 202 in specifying an item to be selected. When the controller wheel 204 or the electronic dial 205 is operated to rotate, an electrical pulse signal occurs according to the amount of operation. The system control unit 101 controls various parts of the digital camera 100 based on the pulse signal. The angle of the rotating operation and the number of rotations of the controller wheel 204 or the electronic dial 205 can be determined from the pulse signal. The controller wheel 204 and the electronic dial 205 may be any operation members that can detect a rotating operation. For example, the controller wheel 204 and the electronic dial 205 may be dial operation members which themselves rotate to generate a pulse signal according to the user's rotating operation. The controller wheel 204 may be an operation member that includes a touch sensor, does not itself rotate, and detects a rotating motion of the user's finger on the controller wheel 204 (touch wheel).

The operation unit 120 includes an enlargement button 206. The enlargement button 206 is used to give instructions for an enlarged display of the LV image displayed on the display unit 111.

The operation unit 120 includes a touch panel 127 which can detect a touch on the display unit 111. The touch panel 127 is integrally configured with the display unit 111. For example, the touch panel 127 is configured so that its light transmittance does not interfere with the display of the display unit 111, and is attached onto the display surface of the display unit 111. Input coordinates of the touch panel 127 are associated with display coordinates on the display unit 111. In such a manner, a graphical user-interface (GUI) that allows the user to make operations as if directly operating a screen displayed on the display unit 111 can be configured.

The system control unit 101 can detect a touch operation on the touch panel 127 with a finger or a pen (hereinafter, referred to as a finger). Possible touch operations include the following:

That a finger not in touch with the touch panel 127 newly touches the touch panel 127. In other words, a start of a touch (hereinafter, referred to as a touch-down).

That the touch panel 127 is being touched with a finger (hereinafter, referred to as a touch-on), That a finger moves in touch with the touch panel 127 (hereinafter, referred to as a touch-move).

That a finger touching the touch panel 127 is released. In other words, an end of a touch (hereinafter, referred to as a touch-up).

That nothing is touching the touch panel 127 (hereinafter, referred to as a touch-off).

If a touch-down is detected, a touch-on is simultaneously detected. After a touch-down, a touch-on usually continues to be detected unless a touch-up is detected. A touch-move can be detected in a state where a touch-on is detected. If a touch-on is detected and the touch position does not move, a touch-move is not detected. After a touch-up of all fingers touching the touch panel 127 is detected, a touch-off occurs.

The position coordinates where the touch panel 127 is touched with a finger are notified to the system control unit 101 via an internal bus. Based on the notified information, the system control unit 101 can determine what touch operation is made on the touch panel 127. As for a touch-move, a vertical component and a horizontal component of the moving direction of the finger moving on the touch panel 127 are separately determined based on a change in the position coordinates. If a touch-move is detected for a predetermined distance or more, a slide operation is determined to be made. An operation of quickly moving a finger in touch with the touch panel 127 for some distance and immediately releasing the finger will be referred to as a flick. In other words, a flick is an operation of quickly sweeping a finger over the touch panel 127 as if flicking. If a touch-move is detected to be made for a predetermined distance or more at a predetermined speed or more and a touch-up is immediately detected, a flick is determined to be made (a flick can be determined to be made after a slide operation). A touch operation of simultaneously touching a plurality of points (for example, two points) and bringing the touch positions close to each other is referred to as a pinch-in. A touch operation of separating the touch positions from each other is referred to as a pinch-out.

There have been touch panels of various methods, including a resistive, capacitive, surface elastic wave, infrared, electromagnetic induction, image recognition, and optical sensor methods. A touch panel of any of the methods may be used. Some methods detect a touch based on a contact on the touch panel. Some methods detect a touch based on an approach of a finger to the touch panel. Either type of method may be used.

The digital camera 100 can provide an enlarged display of an LV image in an LV imaging mode in which the LV image is displayed as an imaging standby screen. The enlarged display of the LV image allows detailed observation of an object included in the enlargement area for a stricter focus adjustment. In the present embodiment, the enlargement magnification of the LV image can be switched to any one of actual size (1 time), 5 times, and 10 times. As will be described in detail below, if a focus mode is set to a manual focus (MF) mode, an enlargement area frame 507 based on information about the enlargement area (enlargement position and enlargement magnification), stored in the nonvolatile memory 114, is superimposed and displayed on the LV image according to pressing of the enlargement button 206 or a touch-down on an enlargement touch button 502. The nonvolatile memory 114 stores the information about the enlargement area in an updatable manner. The enlargement area set in the previous LV enlargement mode is stored in the nonvolatile memory 114. Subsequently, if the pressing of the enlargement button 206 is released (cancelled) or a touch-up from the enlargement touch button 502 is made, an enlarged display of the LV image in the enlargement area indicated by the enlargement area frame 507 is provided.

Details of LV imaging mode processing are described below.

Figure 3A:
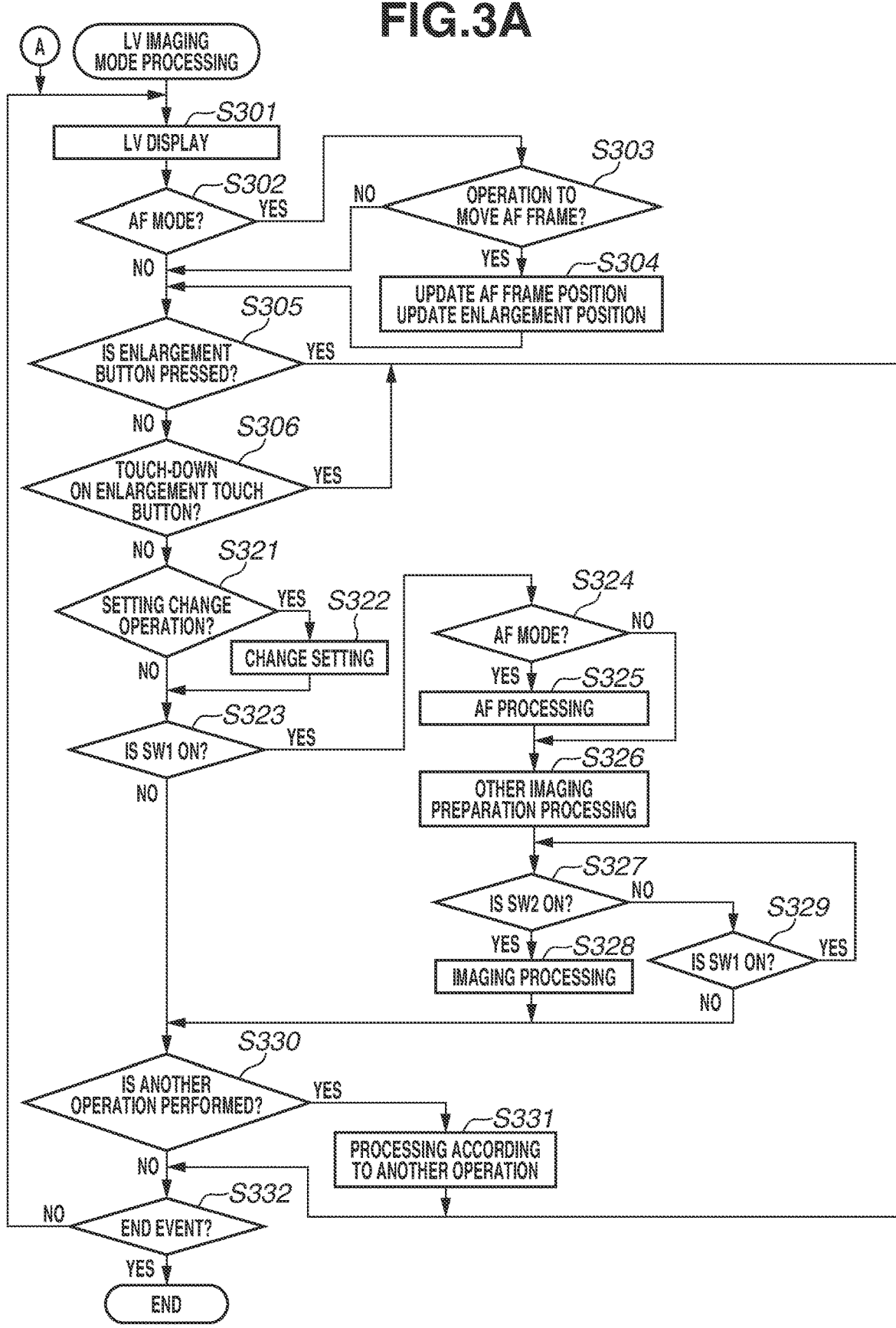
FIG. 3 (consisting of FIGS. 3A and 3B) is a flowchart illustrating live view imaging mode processing.
Figure 3B:
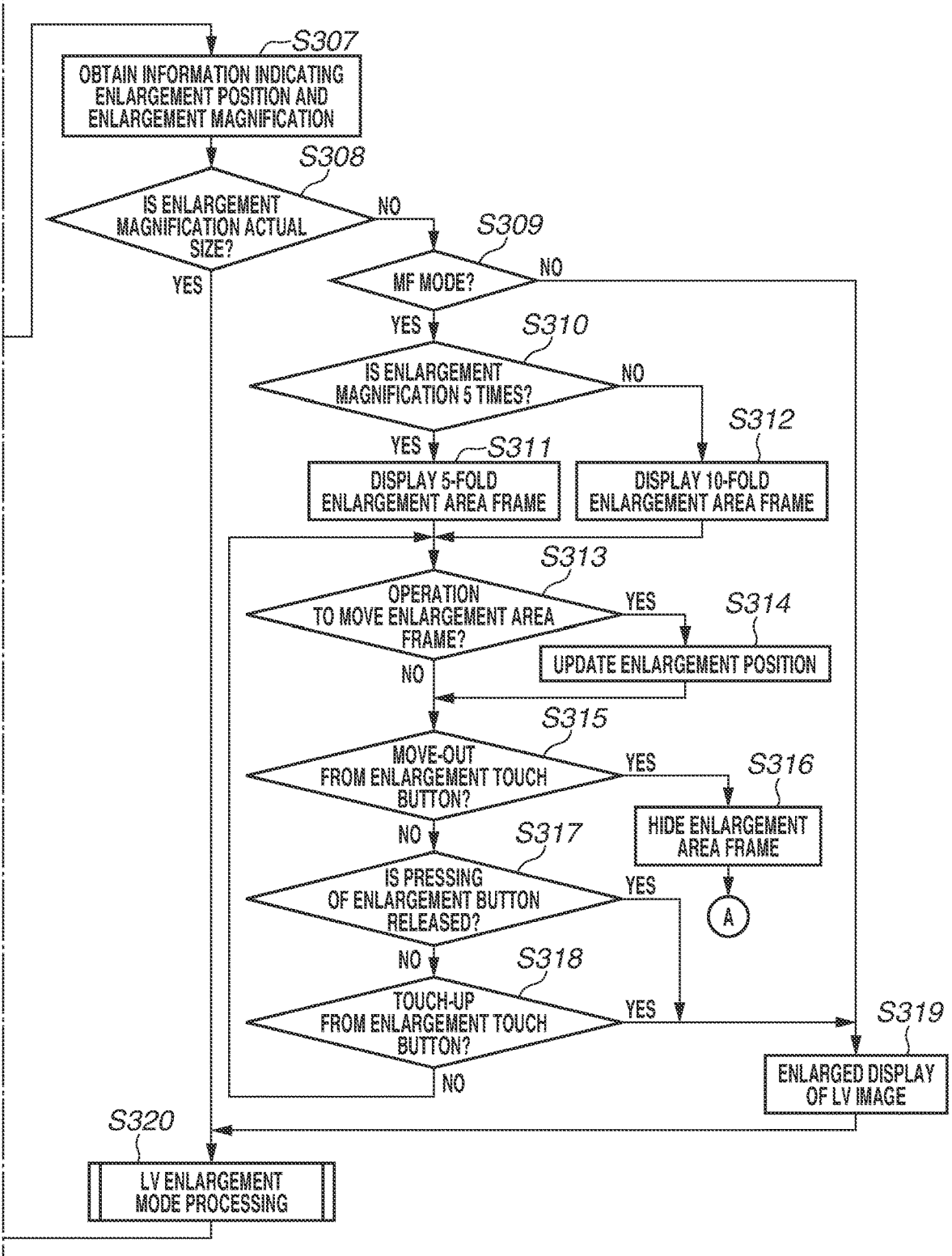

FIG. 3 (consisting of FIGS. 3A and 3B) illustrates the LV imaging mode processing of the digital camera 100. The flowchart of FIG. 3 is implemented by the system control unit 101 loading a program stored in the nonvolatile memory 114 into the system memory 112 and executing the program. The flowchart of FIG. 3 is started when the digital camera 100 is powered on and the LV imaging mode is set. In step S301, the system control unit 101 provides an LV display on the display unit 111. The system control unit 101 displays an LV image as the imaging standby screen on the display unit 111, and displays various types of information. The LV display here is an actual-size display, so that the entire LV image is displayed within the display unit 111.

In step S302, the system, control unit 101 determines whether the focus mode is set to an AF mode. If the focus mode is set to the AF mode (YES in step S302), the processing proceeds to step S303. If not (the focus mode is set to the MF mode) (NO in step S302), the processing proceeds to step S305.

Figure 5A:
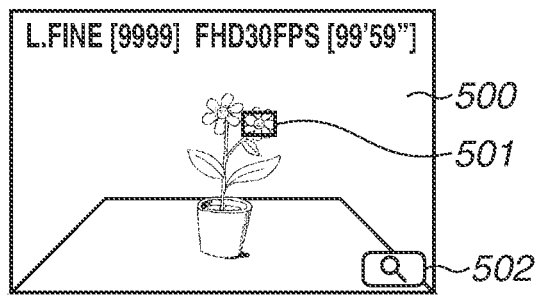
FIGS. 5A to 5I are diagrams illustrating examples of a live view display.

FIGS. 5A to 5D illustrate examples of the LV display when the focus mode is set to the AF mode. FIG. 5A illustrates an example of the LV display displayed in step S301 when the focus mode is the AF mode. An AF frame 501 and the enlargement touch button 502 are superimposed and displayed on an LV image 500 of actual size. The AF frame 501 is a frame indicating a focus adjustment range. The enlargement touch button 502 is a touch icon used to give instructions for an enlarged display of the LV image 500. Various types of information (exposure settings including at least one of an aperture, shutter speed, International Organization for Standardization (ISO) speed, and exposure correction, imaging settings such as the imaging mode, the remaining number of still images that can be captured, the remaining time of a moving image that can be captured, and the remaining battery level) are displayed according to a setting state of an information display.

Figure 5B:
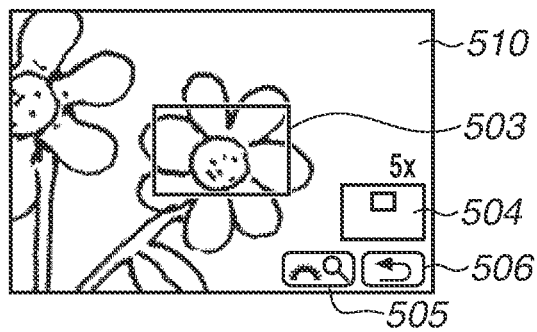
Figure 5C:
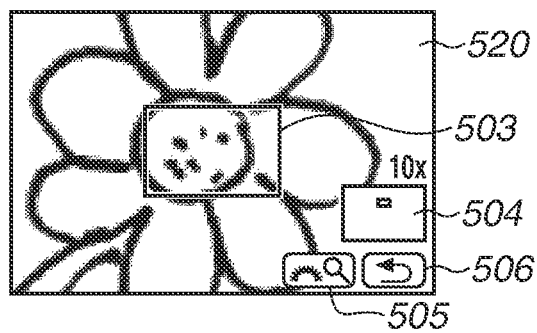
Figure 5D:
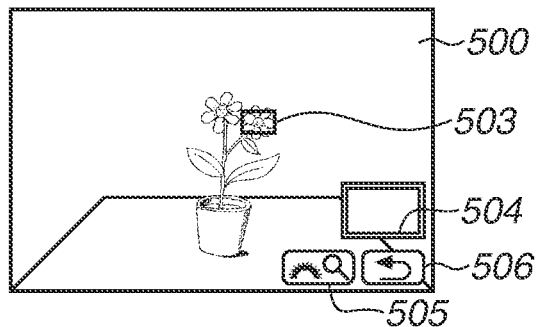
Figure 5E:
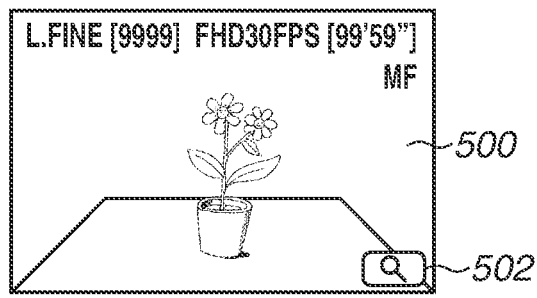

FIGS. 5E to 5I illustrate examples of the LV display when the focus mode is set to the MF mode. FIG. 5E illustrates an example of LV display displayed in step S301 when the focus mode is the MF mode. In the MF mode, unlike FIG. 5A, the AF frame 501 is not displayed. The enlargement touch button 502 is superimposed and displayed on the LV image 500 of actual size. For example, a character string "MF" is further displayed as a display item indicating the MF mode. Various types of information (exposure settings including at least one of the aperture, shutter speed, ISO speed, and exposure correction, imaging settings such as the imaging mode, the remaining number of still images that can be captured, the remaining time of a moving image that can be captured, and the remaining battery level) are displayed according to the setting state of the information display.

In step S303, the system control unit 101 determines whether an operation to move the AF frame 501 is made. The position of the AF frame 501 can be changed according to an operation on the directional pad 202 or a touch operation on the touch panel 127. If an operation to move the AF frame 501 is made (YES in step S303), the processing proceeds to step S304. If no operation to move the AF frame 501 is made (NO in step S303), the processing proceeds to step S305.

In step S304, the system control unit 101 moves the AF frame 501 according to the operation to move the AF frame 501, and stores the position of the AF frame 501 after the movement into the nonvolatile memory 114 (updates an AF frame position). If the operation to move the AF frame 501 is made using the directional pad 202, the system control unit 101 moves the AF frame 501 from the position of the AF frame 501 before the movement in the direction of the operated key of the directional pad 202 by an amount of movement according to the amount (number of times or duration) of operation. If the operation to move the AF frame 501 is a touch-down on the LV image at a position other than display items such as a touch icon, the system control unit 101 moves the AF frame 501 to the touch-down position regardless of the position of the AF frame 501 before the movement. While the specifications here are such that the AF frame 501 is moved to the touch-down position, the specifications may be such that the AF frame 501 is moved to a touch-up position. When moving the AF frame 501, the system control unit 101 updates the enlargement position stored in the nonvolatile memory 114 in a linked manner. The information about the enlargement area (enlargement position and enlargement magnification) set in the previous (i.e., last) LV enlargement mode has been stored in the nonvolatile memory 114, and the system control unit 101 updates the enlargement position so that the center of the enlarged display coincides with the center of the moved AF frame 501.

In step S305, the system control unit 101 determines whether the enlargement button 206 starts to be operated, i.e., whether the enlargement button 206 is pressed. If the enlargement button 206 is pressed (YES in step S305), the processing proceeds to step S307. If the enlargement button 206 is not pressed (NO in step S305), the processing proceeds to step S306.

In step S306, the system, control unit 101 determines whether the enlargement touch button 502 starts to be operated, i.e., whether a touch-down is made on the enlargement touch button 502. If a touch-down is made on the enlargement touch button 502 (YES in step S306), the processing proceeds to step S307. If no touch-down is made on the enlargement touch button 502 (NO in step S306), the processing proceeds to step S321.

In step S307, the system control unit 101 obtains the information indicating the enlargement position and the enlargement magnification, stored in the nonvolatile memory 114. An example of the information indicating the enlargement position is coordinate information about the center of the enlargement area.

In step S308, the system control unit 101 determines whether the enlargement magnification obtained in step S307 is actual size. If the enlargement magnification is actual size (YES in step S308), the processing proceeds to step S320. In such a case, the system, control unit 101 does not provide an enlarged display of the LV image. If the enlargement magnification is not actual size, i.e., higher than that of actual size (i.e., 5 times or 10 times in the present embodiment) (NO in step S308), the processing proceeds to step S309.

In step S309, the system control unit 101 determines whether the focus mode is set to the MF mode. If the focus mode is set to the MF mode (YES in step S309), the processing proceeds to step S310. If not (the focus mode is set to the AF mode) (NO in step S309), the processing proceeds to step S319.

In step S310, the system control unit 101 determines whether the enlargement magnification obtained in step S307 is 5 times. If the enlargement magnification is 5 times (YES in step S310), the processing proceeds to step S311. If not (i.e., 10 times in the present embodiment) (NO in step S310), the processing proceeds to step S312.

In step S311, the system control unit 101 displays the enlargement area frame 507 as an index indicating the 5-fold enlargement area. Here, the system control unit 101 does not provide an enlarged display of the LV image.

Figure 5F:
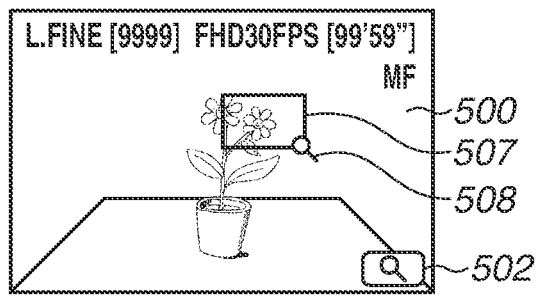

FIG. 5F illustrates an example of the LV display in step S311. FIG. 5F illustrates a display example when the enlargement button 206 continues to be pressed or the enlargement touch button 502 continues to be touched. The enlargement area frame 507 is superimposed and displayed on the LV image 500 of actual size. The enlargement area frame 507 indicates the area of the LV image to be enlarged and displayed, at the enlargement position and enlargement magnification obtained in step S307. The user can easily figure out, before an enlarged display is provided, which position of the LV image is going to be enlarged and displayed in what size by observing the enlargement area frame 507 superimposed on the LV image 500 of actual size. This can reduce possibilities of confusion to be provoked because which position is enlarged and displayed is unknown when an enlarged display of the LV image is provided. If the enlargement button 206 is pressed or a touch-down is made on the enlargement touch button 502, the enlargement area frame 507 is immediately displayed. More specifically, the enlargement area frame 507 is displayed substantially simultaneously with the pressing of the enlargement button 206 or the touch-down on the enlargement touch button 502, even though a slight delay from when the pressing of the enlargement button 206 or the touch-down on the enlargement touch button 502 is detected due to processing time needed to provide the display. The enlargement area frame 507 does not involve clocking processing for providing a time difference from when the pressing of the enlargement button 206 or the touch-down on the enlargement touch button 502 is detected to when the enlargement area frame 507 is displayed. In the present embodiment, the enlargement area frame 507 is displayed at a position irrelevant to the touch position of the touch operation (touch-down on the enlargement touch button 502) triggering the display of the enlargement area frame 507.

For easy distinction from the AF frame 501 displayed in the AF mode, the enlargement area frame 507 is displayed with a display item 508 representing enlargement. For example, to facilitate the user's understanding of the enlargement area frame 507, the display item 508 is modeled after a magnifying glass. However, this is not restrictive. Other models or a character string "enlarged" may be used as long as the user's understanding of the enlargement area frame 507 is assisted. The enlargement area frame 507 and the AF frame 501 may be displayed in different colors or with different types of lines (solid line/broken line, or lines of different thicknesses) for easy distinction. The index indicating the enlargement area is not limited to a frame like that of the present embodiment. The inside and outside of the enlargement area may be displayed in different modes (for example, the inside of the enlargement area is displayed in full color, and the outside of the enlargement area is displayed in monochrome or with oblique lines).

The enlargement area frame 507 is displayed if the focus mode is set to the MF mode, and not displayed if the focus mode is set to the AF mode. The reason is that the AF frame 501 is displayed in the imaging standby state in the AF mode. If the enlargement area frame 507 is displayed, the presence of the two frames makes it confusing and troublesome to see which frame indicates the AF range. If the AF frame 501 is hidden and the enlargement area frame 507 is displayed in the imaging standby state in the AF mode, the enlargement area frame 507 can be mistaken as the AF frame 501. If the AF frame 501 that has been displayed before the enlargement is enlarged and displayed in the center, the user can easily figure out which position is going to be enlarged and displayed, even without the display of the enlargement area frame 507.

In step S312, the system control unit 101 displays an enlargement area frame as an index indicating the 10-fold enlargement area. Here, the system control unit 101 does not provide an enlarged display of the LV image. A display example here is omitted. The 10-fold enlargement area frame is displayed as a frame smaller than the 5-fold enlargement area frame illustrated in FIG. 5F.

In step S313, the system control unit 101 determines whether an operation to move the enlargement area frame 507 is made while the enlargement button 206 continues to be pressed or the enlargement touch button 502 continues to be touched. If an operation to move the enlargement area frame 507 is made (YES in step S313), the processing proceeds to step S314. If no operation to move the enlargement area frame 507 is made (NO in step S313), the processing proceeds to step S315.

In step S314, the system control unit 101 moves the enlargement area frame 507 according to the operation to move the enlargement area frame 507, and updates the enlargement position stored in the nonvolatile memory 114 with that of the enlargement area frame 507 moved.

In step S315, the system control unit 101 determines whether a move-out from the enlargement touch button 502 is made. A move-out from the enlargement touch button 502 refers to a touch-move that is made in a state where the inside of a touch reaction area of the enlargement touch button 502 is being touched, to outside the touch reaction area of the enlargement touch button 502 without the touch being released. If a move-out from the enlargement touch button 502 is made (YES in step S315), the processing proceeds to step S316. If no move-out from the enlargement touch button 502 is made (NO in step S315), the processing proceeds to step S317.

In step S316, the system control unit 101 hides the enlargement area frame 507. The processing returns to step S301. After a touch-down on the enlargement touch button 502 to display the enlargement area frame 507 and check the enlargement area, the user can thus restore the state before the display of the enlargement area frame 507 without an enlarged display, by making a move-out from the enlargement touch button 502.

In step S317, the system control unit 101 determines whether the pressing of the enlargement button 206 is cancelled, i.e., whether the pressing of the enlargement button 206 is released. If the pressing of the enlargement button 206 is released (YES in step S317), the processing proceeds to step S319. If not (NO in step S317), the processing proceeds to step S318. The enlargement area frame 507 can be observed until the pressing of the enlargement button 206 is released. If the user wants to take time to observe the enlargement area frame 507, the user can thus continue pressing the enlargement button 206.

In step S318, the system control unit 101 determines whether a touch-down on the enlargement touch button 502 is cancelled, i.e., whether a touch-up from the enlargement touch button 502 is made. If a touch-up from the enlargement touch button 502 is made (YES in step S318), the processing proceeds to step S319. If not (NO in step S318), the processing returns to step S313. The enlargement area frame 507 can be observed until a touch-up from the enlargement touch button 502 is made. If the user wants to take time to observe the enlargement area frame 507, the user can thus continue touching the enlargement touch button 502.

While FIG. 3 illustrates both steps S317 and S318, step S317 may be configured to be performed if the enlargement area frame 507 is displayed by the pressing of the enlargement button 206. Step S318 may be configured to be performed if the enlargement area frame 507 is displayed by a touch-down on the enlargement touch button 502.

In step S319, the system control unit 101 provides an enlarged display of the LV image at the enlargement position (if the enlargement position is updated in step S314, the updated enlargement position) and the enlargement magnification obtained in step S307.

In step S320, the system control unit 101 performs LV enlargement mode processing. The LV enlargement mode processing will be described below with reference to FIG. 4.

In step S321, the system control unit 101 determines whether a setting change operation is made. If a setting change operation is made (YES in step S321), the processing proceeds to step S322. If no setting change operation is made (NO in step S321), the processing proceeds to step S323. In step S322, the system control unit 101 changes a setting according to the setting change operation. For example, the system control unit 101 changes the shutter speed or an aperture value according to a rotating operation on the electronic dial 205. The system control unit 101 switches the focus mode between the AF mode and the MF mode according to an operation of an AF/MF switch button included in the operation unit 120.

In step S323, the system control unit 101 determines whether the shutter button 115 is half-pressed to turn on the first shutter switch signal SW1. If the first shutter switch signal SW1 is on (YES in step S323), the processing proceeds to step S324. If the first shutter switch signal SW1 is not on (NO in step S323), the processing proceeds to step S330.

In step S324, the system control unit 101 determines whether the focus mode is set to the AF mode. If the focus mode is set to the AF mode (YES in step S324), the processing proceeds to step S325. If not (the focus mode is set to the MF mode) (NO in step S324), the processing proceeds to step S326.

In step S325, the system control unit 101 performs the AF processing based on the position of the AF frame 501.

In step S326, the system control unit 101 performs other imaging preparation processing such as the AE processing and the AWB processing.

In step S327, the system control unit 101 determines whether the shutter button 115 is fully pressed to turn on the second shutter switch signal SW2. If the second shutter switch signal SW2 is on (YES in step S327), the processing proceeds to step S328. If the second shutter switch signal SW2 is not on (NO in step S327), the processing proceeds to step S329.

In step S328, the system control unit 101 performs a series of imaging processes up to recording of an image captured by the imaging of the imaging unit 106 as an image file onto the recording medium 124. In step S329, the system control unit 101 determines whether the first shutter switch signal SW1 remains on. If the first shutter switch signal SW1 is on (YES in step S329), the processing returns to step S327. If the first shutter switch signal SW1 is off (NO in step S329), the processing proceeds to step S330.

In step S330, the system control unit 101 determines whether another operation is performed. If another operation is performed (YES in step S330), the processing proceeds to step S331. If no other operation is performed (NO in step S330), the processing proceeds to step S332.

In step S331, the system control unit 101 performs processing according to the operation performed in step S330. For example, the system control unit 101 can display a menu screen to make various settings or perform information display switching for changing the type and number of pieces of information to be superimposed and displayed on the LV image.

In step S332, the system, control unit 101 determines whether an end event of the LV imaging mode occurs. Examples of the end event include an operation to turn off the power and a switching instruction for an operation mode other than the LV imaging mode, such as the playback mode. If there is no end event (NO in step S332), the processing returns to step S301. If there occurs an end event (YES in step S332), the LV imaging mode processing ends.

Figure 4:
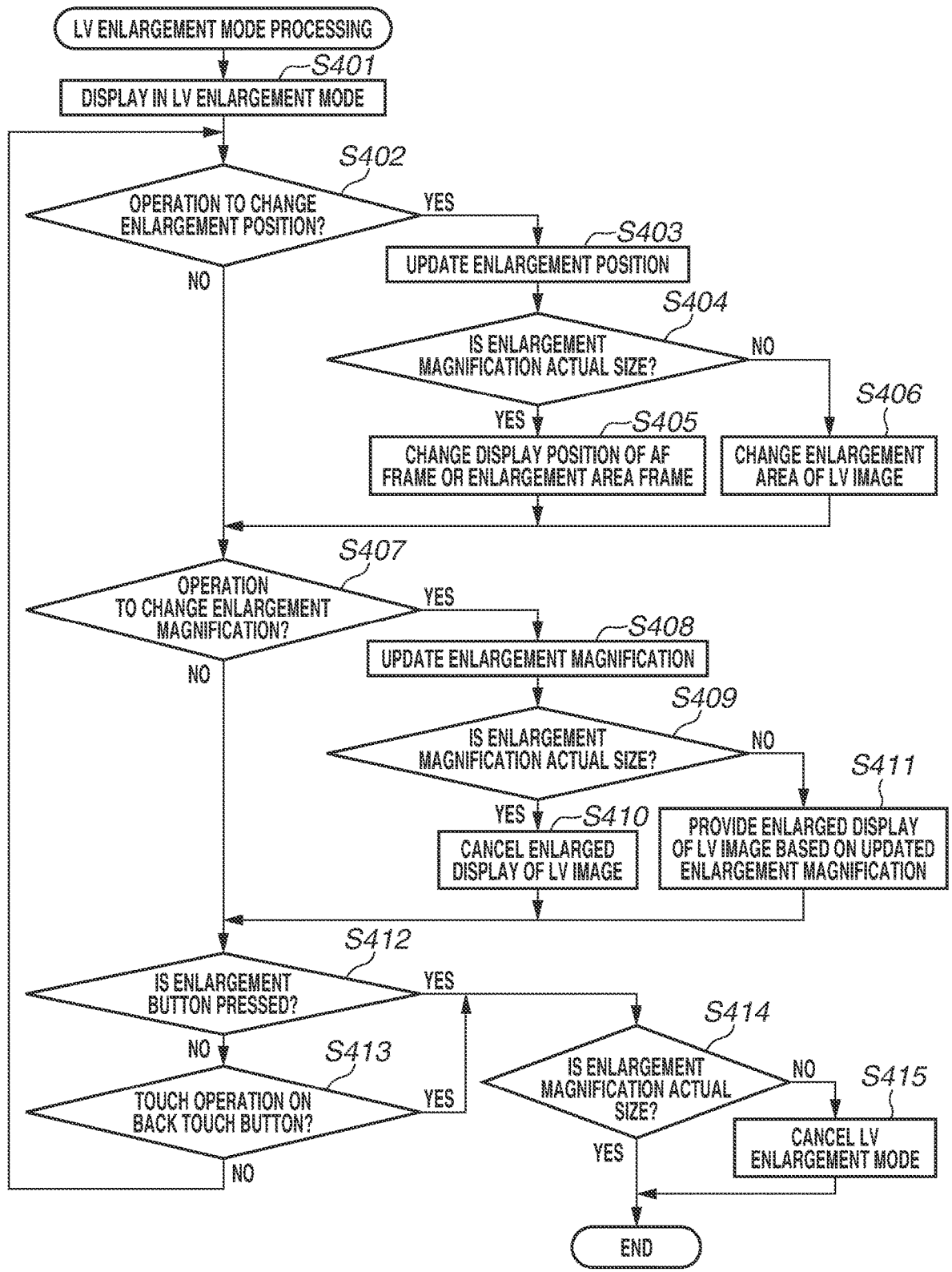
FIG. 4 is a flowchart illustrating details of live view enlargement mode processing in the live view imaging mode processing.

FIG. 4 illustrates details of the LV enlargement mode processing in step S320 of FIG. 3. The flowchart of FIG. 4 is implemented by the system control unit 101 loading a program stored in the nonvolatile memory 114 into the system memory 112 and executing the program.

In step S401, the system control unit 101 provides a display in the LV enlargement mode.

FIG. 5B illustrates a display example in the LV enlargement mode when the focus mode is the AF mode and the enlargement magnification is 5 times. As illustrated in FIG. 5B, an AF frame 503 and an indicator 504 indicating the enlargement area are superimposed and displayed on an LV image 510 which is a 5-fold enlarged display. The AF frame 503 is displayed to indicate the current AF position stored in the nonvolatile memory 114. In the present embodiment, the AF position and the enlargement position are linked with each other. In the example of FIG. 5B in which a 5-fold enlarged LV image is displayed, the center of the screen (i.e., the center of the enlargement area) coincides with the center of the AF frame 503. The indicator 504 includes an outer frame representing the entire LV image 500 and an inner frame representing the currently-displayed area (enlargement area) therein. An enlargement magnification change touch button 505 is a touch icon for changing the enlargement magnification in the LV enlargement mode. Each time a tap operation (operation of making a touch-down and a touch-up without a touch-move) is made on the enlargement magnification change touch button 505, the enlargement magnification is changed in order of 5 times, 10 times, actual size, 5 times, and so on. The enlargement magnification change touch button 505 also functions as an operation guide indicating that the enlargement magnification can be changed by a rotating operation of the electronic dial 205. A back touch button 506 is a touch icon for accepting an instruction to return from the LV enlargement mode to the imaging standby screen. In the LV enlargement mode, unlike the imaging standby screen, various types of information (exposure settings including at least one of the aperture, shutter speed, ISO speed, and exposure correction, imaging settings such as the imaging mode, the remaining number of still images that can be captured, the remaining time of a moving image that can be captured, and the remaining battery level) are not displayed. The purpose is to not interfere with the visual observation of the LV image 510 enlarged and displayed.

FIG. 5C illustrates a display example in the LV enlargement mode when the focus mode is the AF mode and the enlargement magnification is 10 times. FIG. 5C is similar to FIG. 5B except that the LV image 520 is a 10-fold enlarged display and that the area indicated by the indicator 504 is a 10-fold enlargement area (an even narrower area with respect to the entire LV image 500).

FIG. 5D illustrates a display example in the LV enlargement mode when the focus mode is the AF mode and the enlargement magnification is actual size. The AF frame 503 is displayed not at the center of the screen but to indicate the set position with respect to the entire LV image 500 of actual size. The inner and outer frames of the indicator 504 indicate substantially equal areas, which indicates that the LV image 500 is not enlarged. In other respects, FIG. 5D is similar to FIG. 5B.

Figure 5G:
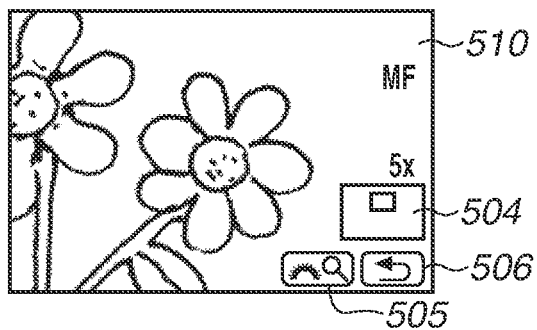

FIG. 5G illustrates a display example in the LV enlargement mode when the focus mode is the MF mode and the enlargement magnification is 5 times. In the MF mode, the AF frame 503 illustrated in FIG. 5B is not displayed. There is displayed a character string "MF" which indicates the MF mode. In other respects, FIG. 5G is similar to FIG. 5B in the AF mode.

Figure 5H:
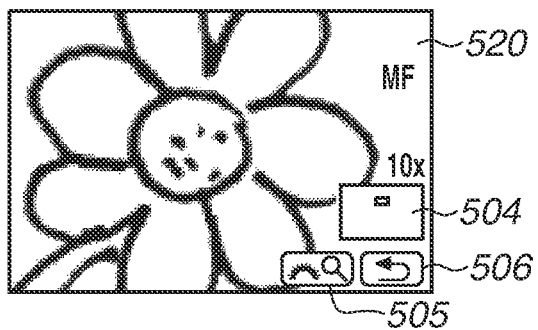

FIG. 5H is a display example in the LV enlargement mode when the focus mode is the MF mode and the enlargement magnification is 10 times. FIG. 5H is similar to FIG. 5G except that the LV image 520 is a 10-fold enlarged display and that the area indicated by the indicator 504 is a 10-fold enlargement area (an even narrower area with respect to the entire LV image 500).

Figure 5I:
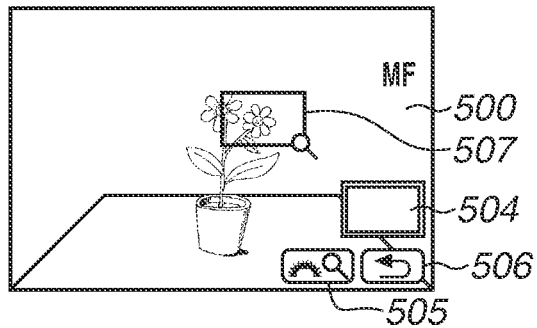

FIG. 5I illustrates a display example in the LV enlargement mode when the focus mode is the MF mode and the enlargement magnification is actual size. The inner and outer frames of the indicator 504 indicate substantially equal areas, which indicates that the LV image 500 is not enlarged. The AF frame 503 is not displayed, and the enlargement area frame 507 is displayed instead. The enlargement area frame 507 indicates the enragement position stored in the nonvolatile memory 114 and the enlargement area for a case where the LV image 500 is enlarged by 5 times which is the next enlargement magnification to be set when an enlargement magnification change operation is made. In other respects, FIG. 5I is similar to FIG. 5G.

In step S402, the system control unit 101 determines whether an operation to change the enlargement position is made. If the enlargement magnification is 5 times or 10 times, an operation to change the enlargement position can be made by operating the directional pad 202. If the enlargement magnification is actual size, an operation to change the enlargement position can be made by a touch operation on the LV image 500 aside from the operation of the directional pad 202. If an operation to change the enlargement position is made (YES in step S402), the processing proceeds to step S403. If no operation to change the enlargement position is made (NO in step S402), the processing proceeds to step S407.

In step S403, the system control unit 101 updates the enlargement position of the nonvolatile memory 114 according to the operation to change the enlargement position that is accepted in step S402.

In step S404, the system control unit 101 determines whether the enlargement magnification is actual size. If the enlargement magnification is actual size (YES in step S404), the processing proceeds to step S405. If not (in the present embodiment, 5 times or 10 times), the processing proceeds to step S406.

In step S405, the system control unit 101 changes the position of the frame superimposed and displayed on the LV image 500 of actual size based on the updated enlargement position. If the focus mode is the AF mode, the system control unit 101 changes the position of the AF frame 503 illustrated in FIG. 5D. If the focus mode is the MF mode, the system control unit 101 changes the position of the enlargement area frame 507 illustrated in FIG. 5I.

In step S406, the system control unit 101 changes the enlargement area in the LV image based on the updated enlargement position.

In step S407, the system control unit 101 determines whether an operation to change the enlargement magnification is made. An operation to change the enlargement magnification can be made by a rotating operation of the electronic dial 205 or a tap operation on the enlargement magnification change touch button 505. If an operation to change the enlargement magnification is made (YES in step S407), the processing proceeds to step S408. If no operation to change the enlargement magnification is made (NO in step S407), the processing proceeds to step S412.

In step S408, the system control unit 101 updates the enlargement magnification stored in the nonvolatile memory 114 according to the operation to change the enlargement magnification, accepted in step S407. If the change of the enlargement magnification is instructed by a rotating operation of the electronic dial 205 and the rotating operation is made in a forward direction (clockwise), the system control unit 101 changes the enlargement magnification from actual size to 5 times, from 5 times to 10 times, and from 10 times to actual size at each command, and updates the enlargement magnification stored in the nonvolatile memory 114. If the change of the enlargement magnification is instructed by a rotating operation of the electronic dial 205 and the rotating operation is made in a reverse direction (counterclockwise), the system control unit 101 changes the enlargement magnification from actual size to 10 times, from 10 times to 5 times, and from 5 times to actual size at each command, and updates the enlargement magnification stored in the nonvolatile memory 114. If the change of the enlargement magnification is instructed by a tap operation on the enlargement magnification change touch button 505, the system control unit 101 changes the enlargement magnification from actual size to 5 times, from 5 times to 10 times, and from 10 times to actual size at each tap operation, and updates the enlargement magnification stored in the nonvolatile memory 114.

In step S409, the system control unit 101 determines whether the updated enlargement magnification is actual size. If the updated enlargement magnification is actual size (YES in step S409), the processing proceeds to step S410. If not (in the present embodiment, 5 times or 10 times), the processing proceeds to step S411.

In step S410, the system control unit 101 cancels the enlarged display of the LV image 500, and displays the LV image 500 of actual size. FIGS. 5D and 5I above illustrate display examples here.

In step S411, the system control unit 101 provides an enlarged display of the LV image 500 based on the updated enlargement magnification. FIGS. 5B, 5C, 5G, and 5H illustrate display examples here.

In step S412, the system control unit 101 determines whether the enlargement button 206 is pressed. If the enlargement button 206 is pressed (YES in step S412), the processing proceeds to step S414. If the enlargement button 206 is not pressed (NO in step S412), the processing proceeds to step S413.

In step S413, the system control unit 101 determines whether a touch operation (more specifically, a tap operation) is made on the back touch button 506. If a touch operation is made on the back touch button 506 (YES in step S413), the processing proceeds to step S414. If no touch operation is made on the back touch button 506 (NO in step S413), the processing returns to step S402 and the system control unit 101 repeats the processing.

In step S414, the system control unit 101 determines whether the current enlargement magnification (the same enlargement magnification as that immediately before the pressing of the enlargement button 206 in step S412 or immediately before the touch operation on the back touch button 506 in step S413) is actual size. If the current enlargement magnification is not actual size (NO in step S414), the processing proceeds to step S415. In step S415, the system control unit 101 cancels the enlarged display of the LV image 500, displays the LV image 500 of actual size, and ends the LV enlargement mode. If the LV enlargement mode ends, the touch buttons 505 and 506 are hidden, and the processing proceeds to step S301 of FIG. 3 to display the foregoing imaging standby screen. Even if the LV enlargement mode is canceled, the enlargement position and enlargement magnification set by the user in the LV enlargement mode are stored in the nonvolatile memory 114. In other words, the enlargement position and enlargement magnification stored immediately before the pressing of the enlargement button 206 in step S412 or immediately before the tap operation on the back touch button 506 in step S413 are retained. When the enlargement button 206 is pressed or a touch-down is made on the enlargement touch button 502 next time, the enlargement area frame 507 is displayed based on the enlargement position and enlargement magnification set in the previous LV enlargement mode, stored in the nonvolatile memory 114.

Although omitted in FIG. 4, the system control unit 101, even in the LV enlargement mode, can perform imaging processing similar to that of step S328 according to a full-pressing operation of the shutter button 115. Imaging can thus be performed even in a state where the LV image 500 is enlarged.

As described above, if the focus mode is set to the MF mode in the LV imaging mode, the enlargement area frame 507 is superimposed and displayed on the LV image 500 according to a start of operation of a predetermined operation member (pressing of the enlargement button 206 or a touch-down on the enlargement touch button 502). If the operation of the predetermined operation member is cancelled (the pressing of the enlargement button 206 is released or a touch-up from the enlargement touch button 502 is made), an enlarged display of the LV image in the enlargement area indicated by the enlargement area frame 507 is then provided, even without a start of a new operation (pressing of the enlargement button 206 or a touch-down on the enlargement touch button 502).

In such a manner, the enlargement area can be checked and an enlargement display can be provided in the course of a series of operations. In providing an enlarged display of the LV image 500, this can make the enlargement area easily recognizable and reduce the number of operations needed to provide the enlarged display. Since the enlargement area can be checked and the enlarged display can be provided in the course of a series of operations, the user does not need to make operations in consideration of giving separate instructions for the checking of the enlargement area and the provision of the enlarged display. In other words, the checking of the enlargement area and the provision of the enlarged display can be achieved without forcing the user to make an additional operation for checking the enlargement area. If the user wants to quickly view an enlarged display without taking time to check the enlargement area, the user can press and release the enlargement button 206 or make a touch-down and a touch-up on the enlargement touch button 502 quickly. This provides high operation responsiveness. The user can thus use an enlarged display with high operability.

A modification of the foregoing embodiment is described below.

In the embodiment, as illustrated in FIG. 3, an enlarged display is described to be immediately provided in response to the release of the pressing of the enlargement button 206 or a touch-up from the enlargement touch button 502. This provides convenience of high operation responsiveness. However, if the enlargement button 206 is quickly pressed and released or a touch-down and a touch-up are quickly made on the enlargement touch button 502, the user may fail to sufficiently observe the display of the enlargement, area frame 507.

Then, if the pressing of the enlargement button 206 is released or a touch-up from the enlargement touch button 502 is made before a previously-set minimum display time elapses from the display of the enlargement area frame 507, the enlargement display may be provided after a lapse of the minimum display time. For example, the minimum display time is set to 0.5 seconds. In such a case, the system timer 113 starts counting when the enlargement area frame 507 is displayed in step S311 or S312. Then, at the stage before step S319, the system control unit 101 determines whether the minimum display time is reached. If the minimum display time is reached, the processing proceeds to step S319. If the minimum display time is not reached, the system control unit 101 waits for the lapse of the minimum display time before the processing proceeds to step S319. This allows the user to more adequately check the enlargement area before the provision of the enlarged display, and can reduce possibilities of confusion about the enlargement area after the provision of the enlarged display.

If the pressing of the enlargement button 206 is not released or a touch-up from the enlargement touch button 502 is not made before a previously-set maximum display time elapses from the display of the enlargement area frame 507, the system control unit 101 may provide an enlarged display after the lapse of the maximum display time. For example, the maximum display time is set to 2 seconds. In such a case, the system timer 113 starts counting when the enlargement area frame 507 is displayed in step S311 or S312. If the determination of step S318 is no (the pressing of the enlargement button 206 is not released, nor is a touch-up from the enlargement touch button 502 made), the system control unit 101 determines whether the maximum display time is reached. If the maximum display time is not reached, the processing returns to step S313 and the system control unit 101 repeats the processing. If the maximum display time is reached, the processing proceeds to step S319. In such a manner, the system control unit 101 can provide an enlarged display when the maximum display time is reached, even if the enlargement button 206 remains pressed or the enlargement touch button 502 remains touched. This can prevent the user from continuing the operation and wasting time before the provision of an enlarged display, not knowing the operation method in that an enlarged display is provided in response to the release of the pressing of the enlargement button 206 or a touch-up from the enlargement touch button 502.

Both the minimum and maximum display times mentioned above may be taken into consideration.

If the pressing of the enlargement button 206 or a touch-down on the enlargement touch button 502 continues for a predetermined time or more from the display of the enlargement area frame 507, the system control unit 101 may enter a position moving mode of the enlargement area frame 507. The reason is that the user may find that, when checking the enlargement area frame 507, the enlargement position is not a predetermined one. For example, the predetermined time is set to 2 seconds. In such a case, the system timer 113 starts counting when the enlargement area frame 507 is displayed in step S311 or S312. If the determination of step S318 is no (the pressing of the enlargement button 206 is not released, nor is a touch-up from the enlargement touch button 502 made), the system control unit 101 determines whether the predetermined time is reached. If the predetermined time is not reached, the processing returns to step S313 and the system control unit 101 repeats the processing. If the predetermined time is reached, the system control unit 101 enters the position moving mode of the enlargement area frame 507. Entering the position moving mode of the enlargement area frame 507, the system control unit 101 provides no enlarged display even if the pressing of the enlargement button 206 is released or a touch-up from the enlargement touch button 502 is made. In the position moving mode of the enlargement area frame 507, the system control unit 101 displays the LV image 500 of actual size and the enlargement area frame 507, accepts operations to move the enlargement position from the user, and moves the enlargement position accordingly. If an operation to give a new instruction for enlargement is made, the system control unit 101 performs enlargement. Such processing is basically similar to that of the LV enlargement mode when the enlargement magnification is actual size. The enlargement area frame 507 is displayed even in the AF mode. The enlargement area frame 507 may be displayed in a different manner, like in different color or blinked, so that the user can easily recognize the operation state capable of moving the enlargement area frame 507.

In the embodiment, as illustrated in FIG. 3, the enlargement position is described to be changeable in steps S313 and S314 while the enlargement button 206 continues to be pressed or the enlargement touch button 502 continues to be touched. However, the enlargement position may be unchangeable at this timing. In such a case, the processing of steps S313 and 314 may be omitted so that the processing proceeds to step S315.

In the embodiment, as illustrated in FIG. 3, the enlargement area frame 507 is described to be displayed if the focus mode is set to the MF mode, and not displayed if the focus mode is set to the AF mode. However, this is not restrictive. The enlargement area frame 507 may be displayed even if the focus mode is set to the AF mode. In such a case, the processing of step S309 may be omitted so that the processing proceeds to step S310. In the AF mode, both the AF frame 501 and the enlargement area frame 507 may be displayed in an identifiable manner. The AF frame 501 may be hidden and the enlargement area frame 507 may be displayed.

In the embodiment, as illustrated in FIG. 3, the state before the display of the enlargement area frame 507 is described to be restored without the provision of an enlarged display if a touch-down is made on the enlargement touch button 502 to display the enlargement area frame 507 and then a move-out from the enlargement touch button 502 is made. The state before the display of the enlargement area frame 507 may be similarly restored without the provision of an enlarged display if the enlargement area frame 507 is displayed by the pressing of the enlargement button 206. For example, if an operation member other than the enlargement button 206 is operated in the state where the enlargement area frame 507 is displayed by the pressing of the enlargement button 206, the state before the display of the enlargement area frame 507 may be restored without the provision of an enlarged display. No enlarged display is provided even if the continued pressing of the enlargement button 206 is then cancelled.

In the embodiment, the present disclosure is described to be applied to an enlarged display of the LV image 500. However, an embodiment of the present disclosure is not limited to an enlarged display of the LV image 500, and may be applied to, for example, an enlarged display of a playback image. For example, if the pressing of an enlargement-instructing button or a touch-down on an enlargement-instructing touch icon is detected while a captured image (playback image) is displayed in actual size (original image may be reduced according to the display area), the system control unit 101 displays an enlargement area frame without enlarging the playback image. If the pressing of the enlargement-instructing button is released or a touch-up from the enlargement-instructing touch icon is made, the system control unit 101 then provides an enlarged display of the playback image. The enlargement area frame may indicate an area based on an enlargement position and an enlargement magnification stored during the previous enlargement operation. The enlargement area frame may indicate a predetermined area such as a 3-fold enlargement area at the center of the screen. The position of the enlargement area frame may be an AF position read from attribute information about the playback image, or that of an area where a face is detected. The enlargement area frame may indicate an area based on an enlargement magnification and an enlargement position that are applied to an image displayed before switching of images by image forwarding.

An embodiment of the present disclosure is not limited to images captured by an imaging apparatus, and may be applied to other display objects capable of enlargement display. Examples include a layout screen of layout software, a web display screen, and display screens of various documents such as a mail display screen.

The present disclosure has been described above in conjunction with the embodiment thereof. The foregoing embodiment is merely an example of embodiment for implementing the present disclosure, and the technical scope of the present disclosure should not be interpreted as being limited thereto. Embodiments of the present disclosure may be practiced in various forms without departing from the technical concept or characteristics of the present disclosure.

For example, various controls described to be performed by the system control unit 101 in the embodiment may be performed by a single piece of hardware. A plurality of pieces of hardware may perform the controls by sharing the processing.

In the embodiment, the present disclosure is described to be applied to the digital camera 100. However, an embodiment of the present disclosure is not limited to such an example, and may be applied to electronic devices that function as a display control unit capable of providing an enlarged display of a display object. For example, an embodiment of the present disclosure may be applied to a personal computer, a personal digital assistant (PDA), a mobile phone terminal, a portable image viewer, a printer apparatus equipped with a display, a digital photo frame, a music player, a game machine, an electronic book reader, a tablet terminal, a smartphone, a projector apparatus, and home appliances, car-mounted apparatuses, and medical devices equipped with a display.

According to an embodiment of the present disclosure, in providing an enlarged display of a display object, the enlargement area can be made easily recognizable and the number of operations needed to provide the enlarged display can be reduced.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment (s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-110982, filed Jun. 5, 2017, which is hereby incorporated by reference herein in its entirety.

What is claimed is:

1. A display control apparatus comprising:
   a memory and at least one processor configured to function as:
   a display control unit configured to perform control to display an image on a display,
   a touch panel,
   a setting unit configured to set a focus mode to one of a manual focus mode and an autofocus mode, and
   a storage unit configured to store information about an enlargement position of the image,
   wherein, in the manual focus mode and in response to a start of a touch operation for enlarging the image displayed on the display while the image is displayed at a first magnification without a frame indicating an enlargement area of the image on the display, the display control unit performs control to display the frame together with the image, and then, continuing in the manual focus mode and in response to an end of the touch operation that caused the frame to be displayed, the display control unit performs control to display the image of the enlargement area enlarged with a second magnification that is larger than the first magnification based on the stored information, and
   wherein, in the autofocus mode and while the image is displayed at the first magnification, the frame is not displayed in response to the start of the touch operation for enlarging the image displayed on the display and, in response to the touch operation for enlarging the image displayed on the display, the display control unit performs control to display the image of the enlargement area enlarged with the second magnification, and
   wherein, in a case where duration of the touch operation reaches a predetermined time, the display control unit further performs control to display the enlarged image of the enlargement area even if a touch-down operation does not end.

2. The display control apparatus according to claim 1, wherein, in the manual focus mode and in a case where the touch operation that caused the frame to be displayed ends before a previously-set minimum display time elapses from when the frame is displayed, the display control unit further performs control to display the enlarged image of the enlargement area after the previously-set minimum display time elapses.

3. The display control apparatus according to claim 1, wherein, in the manual focus mode and in a case where the touch operation that caused the frame to be displayed does not end before a previously-set maximum display time elapses from when the frame is displayed, the display control unit further performs control to display the enlarged image of the enlargement area after the previously-set maximum display time elapses.

4. The display control apparatus according to claim 1, wherein, in the manual focus mode, (i) the start of the touch operation for enlarging the image displayed on the display is a start of detecting a touch-down operation on a specific touch item displayed on the touch panel, and (ii) the end of the touch operation that caused the frame to be displayed is an end of detecting the touch-down operation on the specific touch item.

5. The display control apparatus according to claim 4, wherein, in a case where a touch position is moved to outside an area of the specific touch item after a start of the touch-down operation on the specific touch item, the frame is hidden and the enlarged image of the enlargement area is not displayed even if the touch-down operation ends.

6. The display control apparatus according to claim 1, wherein the frame is at least either a display of an indicator that is superimposed and displayed on the image and indicates the enlargement area, or a display differentiating modes inside and outside the enlargement area.

7. The display control apparatus according to claim 1, wherein the display control unit is further configured to superimpose and display an indicator indicating the enlargement area, along with a display item representing enlargement.

8. The display control apparatus according to claim 1, wherein the information about the image enlargement position is stored in the storage unit before the start of the touch operation for enlarging the image displayed on the display.

9. The display control apparatus according to claim 1,
   wherein the display is a display of an imaging apparatus, and
   wherein the image is a live view image obtained by the imaging apparatus.

10. The display control apparatus according to claim 1, wherein the image is a playback image.

11. The display control apparatus according to claim 1, wherein, in the autofocus mode, the image of the enlargement area is enlarged and displayed in response to the start of the touch operation for enlarging the image displayed on the display.

12. The display control apparatus according to claim 1, wherein, in the autofocus mode, an autofocus frame indicating a focus detection region is superimposed on the image and displayed before the touch operation for enlarging the image displayed on the display is performed.

13. The display control apparatus according to claim 1, wherein the first magnification is an actual size and the second magnification is five times or ten times.

14. A control method for a display control apparatus having a display and a setting unit configured to set a focus mode to one of a manual focus mode and an autofocus mode, the control method comprising:
   storing information about an enlargement position of the image;
   performing control, in the manual focus mode and in response to a start of a touch operation for enlarging the image displayed on the display while the image is displayed at a first magnification without a frame indicating an enlargement area of the image on the display, to display the frame together with the image, and then, continuing in the manual focus mode and in response to an end of the touch operation that caused the frame to be displayed, performing control includes performing control to display the image of the enlargement area enlarged with a second magnification that is larger than the first magnification based on the stored information, and performing control, in the autofocus mode and while the image is displayed at the first magnification, to not display the frame in response to the start of the touch operation for enlarging the image displayed on the display and, in response to the touch operation for enlarging the image displayed on the display, performing control includes performing control to display the image of the enlargement area enlarged with the second magnification, wherein, in a case where duration of the touch operation reaches a predetermined time, performing control includes performing control to display the enlarged image of the enlargement area even if a touch-down operation does not end.

15. A non-transitory computer-readable storage medium storing a program to cause a computer to perform a control method for a display control apparatus according to claim 14.

* * * * *